(12) United States Patent
Lowder et al.

(10) Patent No.: US 7,225,715 B2
(45) Date of Patent: *Jun. 5, 2007

(54) VARIABLE TOOTH SAW BLADE

(75) Inventors: Jeremy A. Lowder, Boone, NC (US); Scott A. Vilagi, Amherst, OH (US)

(73) Assignee: Black & Decker Inc., Townson, MD (US)

( * ) Notice: Subject to any disclaimer, the term of this patent is extended or adjusted under 35 U.S.C. 154(b) by 140 days.

This patent is subject to a terminal disclaimer.

(21) Appl. No.: 10/845,284

(22) Filed: May 13, 2004

(65) Prior Publication Data

US 2005/0109185 A1    May 26, 2005

Related U.S. Application Data

(63) Continuation-in-part of application No. 10/391,425, filed on Mar. 18, 2003, now Pat. No. 7,013,784.

(60) Provisional application No. 60/365,999, filed on Mar. 19, 2002.

(51) Int. Cl.
*B27B 33/08* (2006.01)
*B23D 61/02* (2006.01)

(52) U.S. Cl. .............................. 83/848; 83/676; 83/855

(58) Field of Classification Search ................. 83/661, 83/676, 835, 836, 839, 846–855
See application file for complete search history.

(56) References Cited

U.S. PATENT DOCUMENTS

| | | | |
|---|---|---|---|
| 156,748 A | 11/1874 | Andrews | |
| 245,090 A | 8/1881 | Northway | |
| 352,867 A | 11/1886 | Greist | |
| 514,207 A | 2/1894 | Bott | |
| 1,167,801 A | 1/1916 | De Laney | |
| 1,334,941 A | 3/1920 | Blake | |
| 2,720,229 A * | 10/1955 | Drake | 407/60 |
| 4,270,429 A * | 6/1981 | Brown | 83/851 |
| 4,311,075 A * | 1/1982 | Sundstrom | 83/848 |
| 4,766,794 A | 8/1988 | Blake | |
| 4,848,205 A * | 7/1989 | Suzuki et al. | 83/853 |
| 5,038,653 A | 8/1991 | Slocum et al. | |
| 5,361,665 A | 11/1994 | Sonefors | |
| 6,276,249 B1 * | 8/2001 | Handschuh et al. | 83/851 |
| 7,013,784 B2 * | 3/2006 | Lowder et al. | 83/848 |
| 7,140,287 B2 * | 11/2006 | Lowder et al. | 83/848 |
| 2003/0221534 A1 * | 12/2003 | Lowder et al. | 83/676 |
| 2004/0016125 A1 | 1/2004 | Asada et al. | |
| 2005/0051018 A1 * | 3/2005 | Lowder et al. | 83/835 |

FOREIGN PATENT DOCUMENTS

| | | | |
|---|---|---|---|
| DE | 38 00 561 | * | 7/1989 |
| EP | 0 478 237 | * | 4/1992 |
| WO | WO 03/080281 | * | 10/2003 |

* cited by examiner

*Primary Examiner*—Clark F. Dexter
(74) *Attorney, Agent, or Firm*—Sand & Sebolt

(57) ABSTRACT

An apparatus for cutting materials and more specifically an improved saw blade includes a plurality of variable teeth thereon. The variable tooth saw blade cuts faster and smoother while reducing harmonic vibrations. Specifically, the teeth on the saw blade are grouped into sections with differing circumferential widths and differing spacing between the sections.

46 Claims, 7 Drawing Sheets

VARIABLE TOOTH SAW BLADE

CROSS REFERENCE TO RELATED APPLICATIONS

This application is a continuation-in-part application of U.S. patent application Ser. No. 10/391,425 filed Mar. 18, 2003 now U.S. Pat. No. 7,013,784 which claims priority from U.S. Provisional Patent Application Ser. No. 60/365,999 filed Mar. 19, 2002.

BACKGROUND OF THE INVENTION

1. Technical Field

This invention relates to rotary saw blades, and more particularly circular saw blades for use on circular saws or the like. Specifically, the invention is directed to a variable tooth saw blade that cuts faster and smoother while reducing harmonic vibrations.

2. Background Information

Circular saw blades are readily available for use in cutting wood and other materials using a portable, hand-held circular saw, or a fixed table or radial saws, or other like saws. The saw blades are formed of flat, circular discs made of steel or other like metals. As is well known in the art, circular saw blades include a peripheral edge from which a plurality of circumferentially-spaced teeth project radially outwardly for cutting.

Users continually desire to purchase blades that allow for faster cutting without negative effects such as "burning" of the blade, dulling of the teeth, or jamming of the saw. The ability of the teeth to efficiently cut the material and thus maintain the blade speed is critical. As a result, users continue to desire improved blades providing for faster and/or more efficient cutting.

Users also desire smooth cuts. Often the speed of a cut is inversely correlated to the smoothness of the cut, that is, the faster the user cuts, the rougher is the end cut, and vice versa. As a result, users continue to desire improved smoothness coupled with faster cutting.

Users further desire reduced noise. The high speed at which blades rotate often causes high levels of harmonic vibration leading to excessive noise, undesirable saw or saw blade vibration, and if the vibration is significant, a less than desirable cut. Users thus desire, and often government agencies require, blades providing for reduced noise and thus reduced harmonic vibration.

Consequently, there is a need for an improved saw that cuts faster and smoother while also reducing noise and harmonic vibration.

SUMMARY OF THE INVENTION

The present invention provides a saw blade comprising a flat, circular disc having a peripheral outer edge and a center hole; a plurality of circumferentially-spaced teeth each having a cutting edge and projecting radially outwardly from the peripheral outer edge; a first group of the cutting edges defining a first circumferential width between each adjacent pair of the cutting edges in the first group; a second group of the cutting edges defining a second circumferential width between each adjacent pair of the cutting edges in the second group; the second circumferential width differing from the first circumferential width; and a third group having at least two cutting edges defining a third circumferential width as the distance between adjacent cutting edges in the third group; the third circumferential width differing from the first and second circumferential widths.

The invention further provides a saw blade comprising a flat, circular disc having a peripheral outer edge and a center hole, the disc being divided into a first half and a second half, each half being a copy exact of the other half positioned in a diametrically opposite manner; a plurality of circumferentially-spaced teeth each having a cutting edge and projecting radially outwardly from the peripheral outer edge; a first group in each half having five cutting edges including a first cutting edge and a last cutting edge defining therebetween a first group circumferential width of approximately fifty-six degrees; a second group in each half having three cutting edges including a first cutting edge and a last cutting edge defining therebetween a second group circumferential width of approximately forty degrees; a third group in each half having two cutting edges including a first cutting edge and a last cutting edge defining therebetween a third group circumferential width of approximately twenty-five degrees; a first circumferential space being between the first and second groups in each half and having an approximately fourteen-degree circumferential width; a second circumferential space being between the second and third groups in each half and having an approximately twenty-degree circumferential width; and a third circumferential space being between the third group in each half and the first group in the respective other half and having an approximately twenty-five-degree circumferential width.

The invention further provides a saw blade comprising a flat, circular disc having a peripheral outer edge and a center hole, the disc being divided into a first half and a second half, each half being a copy exact of the other half positioned in a diametrically opposite manner; a plurality of circumferentially-spaced teeth each having a cutting edge and projecting radially outwardly from the peripheral outer edge; a first group in each half having nine cutting edges including a first cutting edge and a last cutting edge defining a first group circumferential width therebetween which is approximately thirty-six degrees; a second group in each half having seven cutting edges including a first cutting edge and a last cutting edge defining a second group circumferential width therebetween which is approximately thirty-six degrees; a third group in each half having five cutting edges including a first cutting edge and a last cutting edge defining a second group circumferential width therebetween which is approximately thirty-six degrees; a fourth group in each half having four cutting edges defining a second group circumferential width therebetween which is approximately forty-five degrees; a first circumferential space being between the first and second groups in each half and having an approximately four-and-a-half-degree circumferential width; a second circumferential space being between the second and third groups in each half and having an approximately six-degree circumferential width; a third circumferential space being between the third and fourth groups in each half and having an approximately nine-degree circumferential width; and a fourth circumferential space being between the fourth group in each half and the first group in the respective other half and having an approximately seven-and-a-half-degree circumferential width.

The invention further provides a saw blade comprising a flat, circular disc having a peripheral outer edge and a center hole, the disc being divided into a first half and a second half, each half being a copy exact of the other half positioned in a diametrically opposite manner; a plurality of circumferentially-spaced teeth each having a cutting edge and projecting radially outwardly from the peripheral outer edge; a first group in each half having twelve cutting edges including a first cutting edge and a last cutting edge defining a first group circumferential width therebetween which is approximately thirty-eight-and-a-half degrees; a second group in each half having eight cutting edges including a first cutting edge and a last cutting edge defining a second group circumferential width therebetween which is approximately thirty-two-and-a-half degrees; a third group in each half having twelve cutting edges including a first cutting edge and a last cutting edge defining a second group circumferential width therebetween which is approximately sixty-six degrees; a fourth group in each half having three cutting edges defining a second group circumferential width therebetween which is approximately twenty-one-and-a-half degrees; a first circumferential space being between the first and second groups in each half and having an approximately three-and-a-half-degree circumferential width; a second circumferential space being between the second and third groups in each half and having an approximately four-and-a-half-degree circumferential width; a third circumferential space being between the third and fourth groups in each half and having an approximately six-degree circumferential width; and a fourth circumferential space being between the fourth group in each half and the first group in the respective other half and having an approximately seven-and-a-half-degree circumferential width.

BRIEF DESCRIPTION OF THE DRAWINGS

Preferred embodiments of the invention, illustrative of the best modes in which the applicant has contemplated applying the principles, are set forth in the following description and are shown in the drawings and are particularly and distinctly pointed out and set forth in the appended claims.

Similar numbers refer to similar parts throughout the specification.

DESCRIPTION OF THE PREFERRED EMBODIMENT

Figure 1:
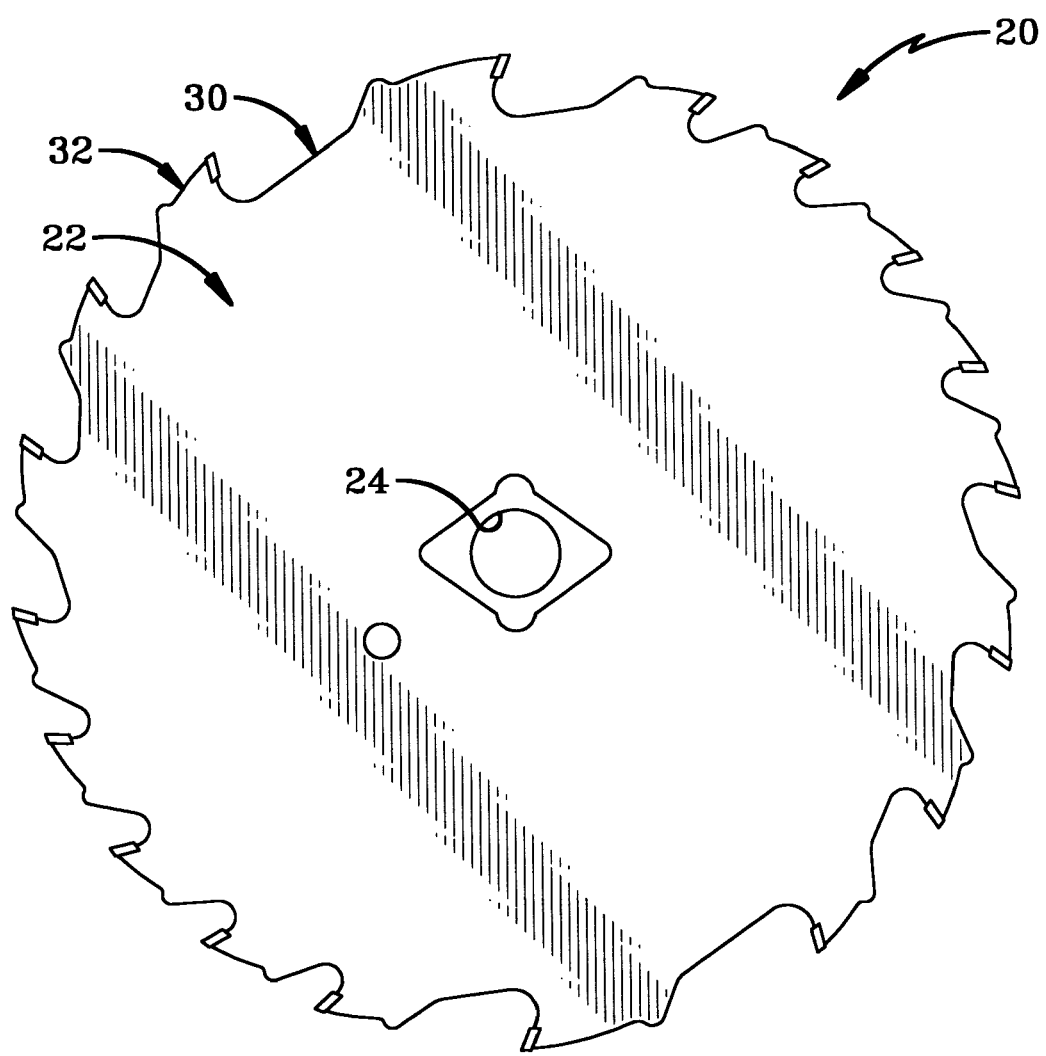
FIG. 1 is a side view of a first embodiment of the saw blade of the present invention.
Figure 2:
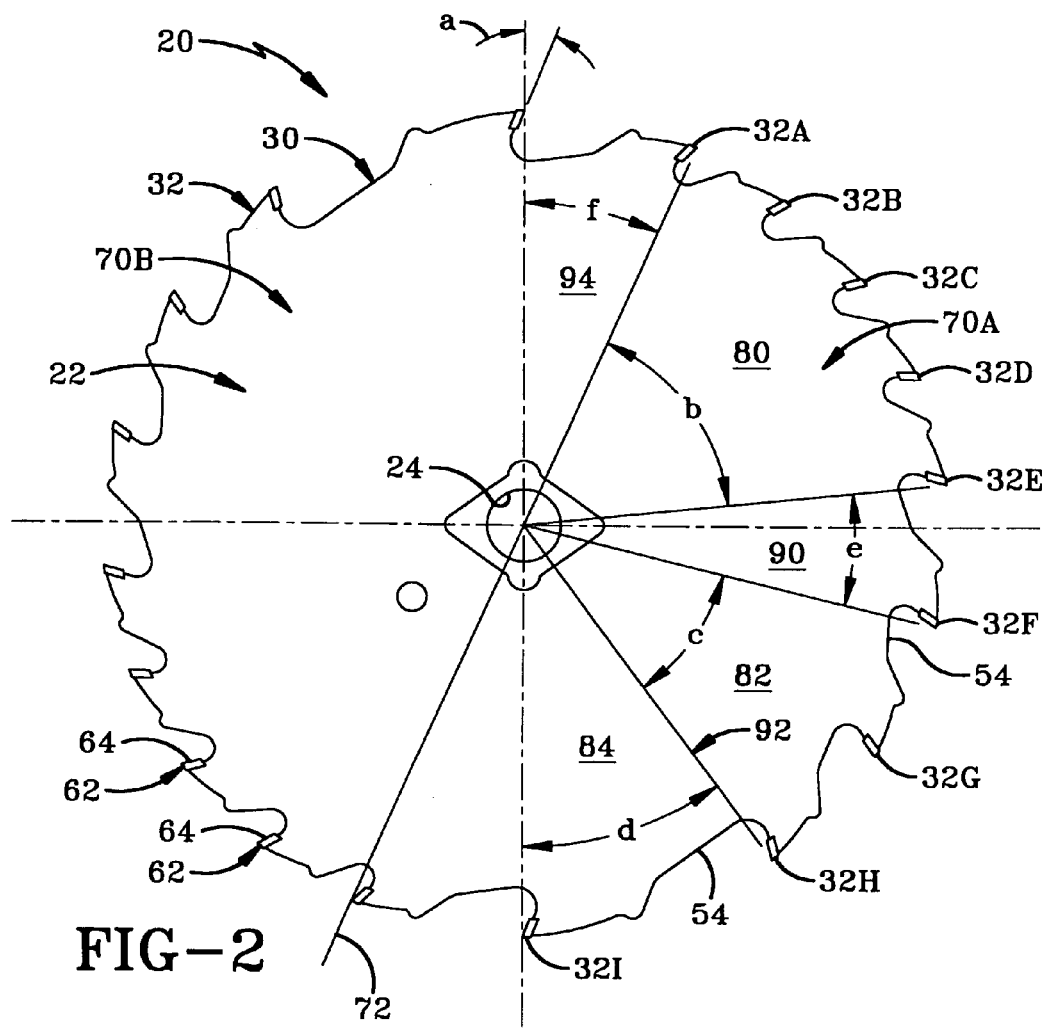
FIG. 2 is the same side view of the first embodiment of the saw blade as in FIG. 1 with the sections clearly marked.
Figure 3:
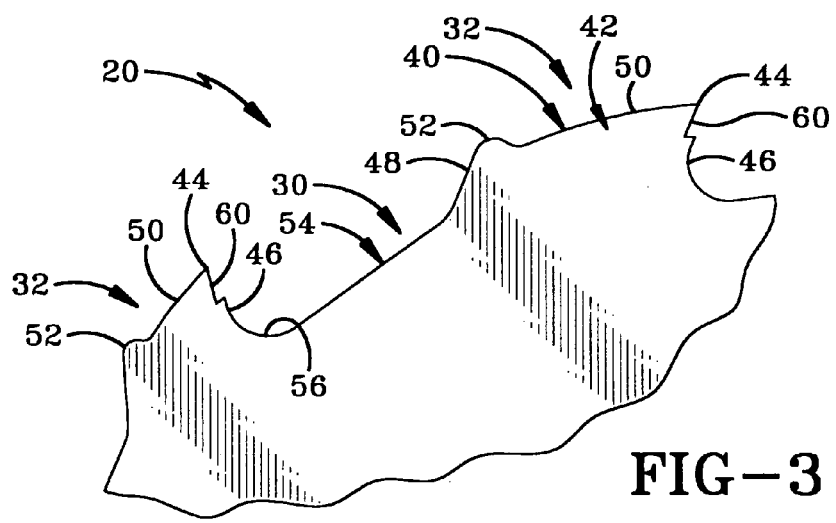
FIG. 3 is an enlarged view of a few teeth from the saw blade of the first embodiment in FIGS. 1–2.
Figure 4:
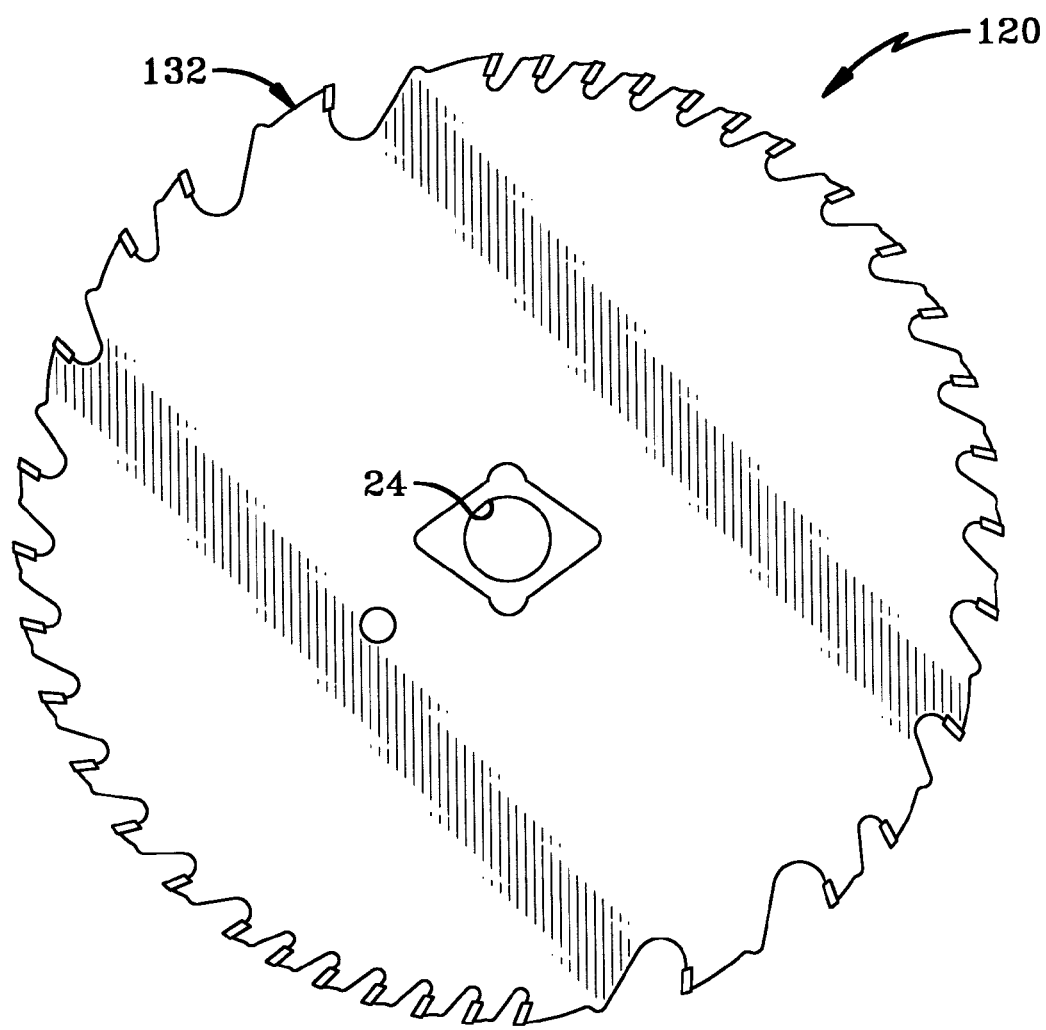
FIG. 4 is a side view of a second embodiment of the saw blade of the present invention.
Figure 5:
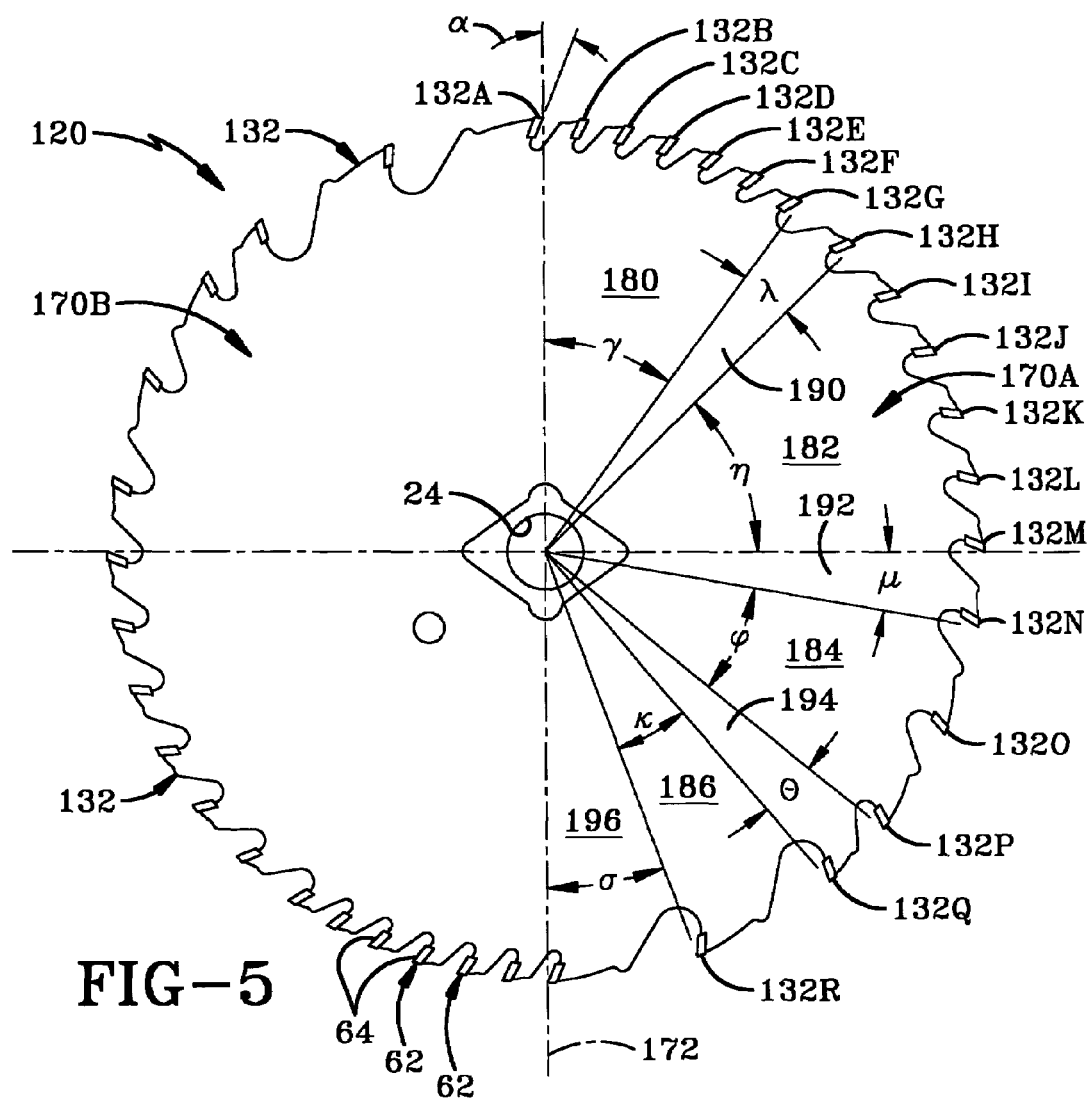
FIG. 5 is the same side view of the second embodiment of the saw blade as in FIG. 4 with the sections clearly marked.
Figure 6:
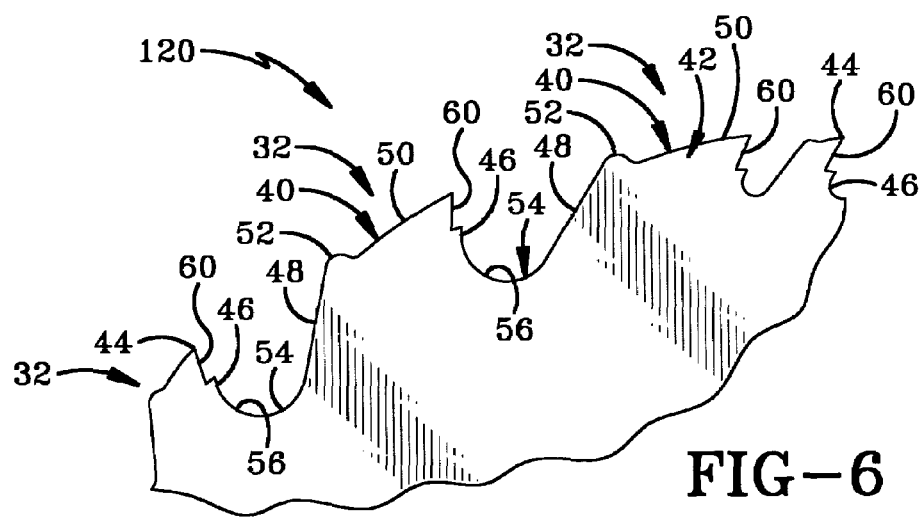
FIG. 6 is an enlarged view of a few teeth from the saw blade of the second embodiment in FIGS. 4–5.
Figure 7:
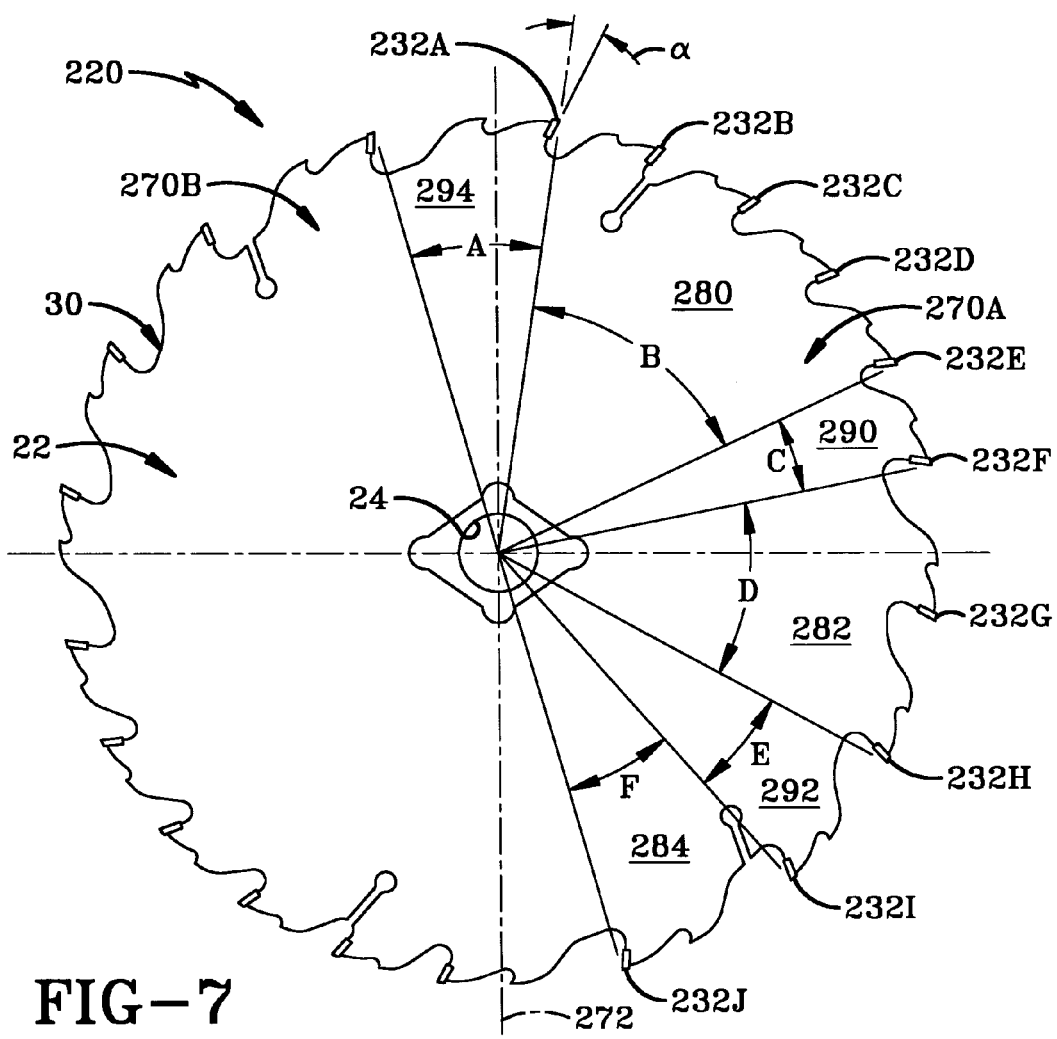
FIG. 7 is a side view of a third embodiment of the saw blade of the present invention with the sections clearly marked.
Figure 8:
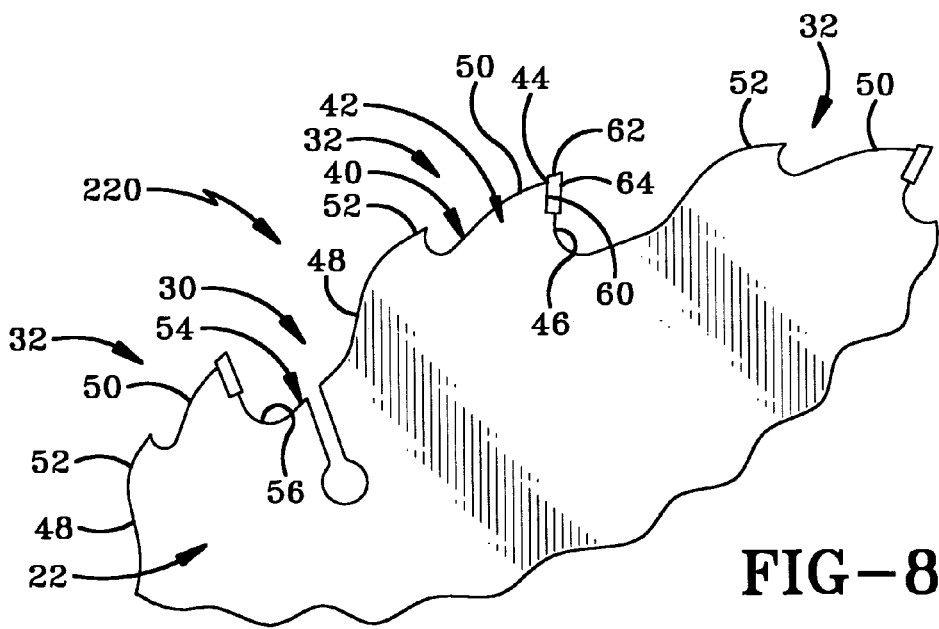
FIG. 8 is an enlarged view of a few teeth from the saw blade of the third embodiment in FIG. 7.
Figure 9:
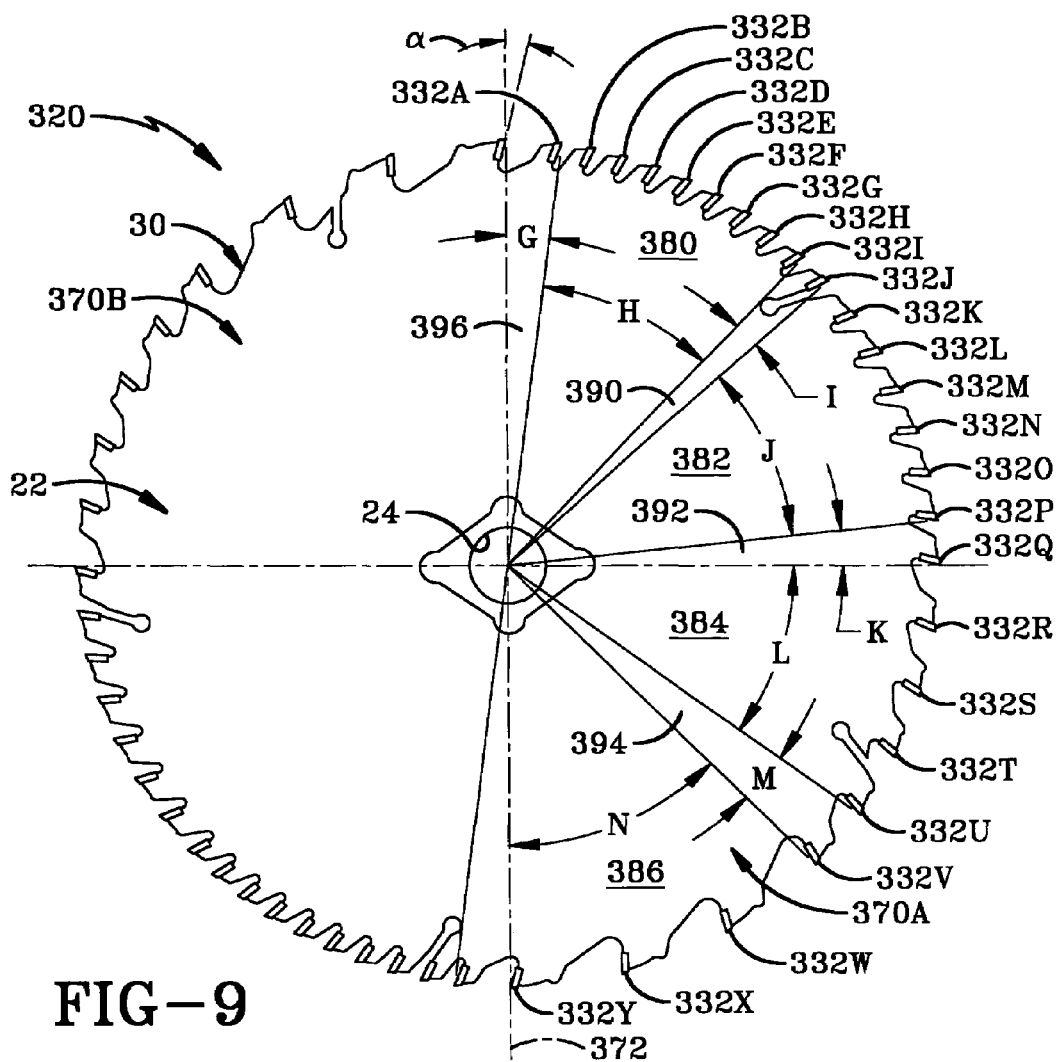
FIG. 9 is a side view of a fourth embodiment of the saw blade of the present invention with the sections clearly marked.
Figure 10:
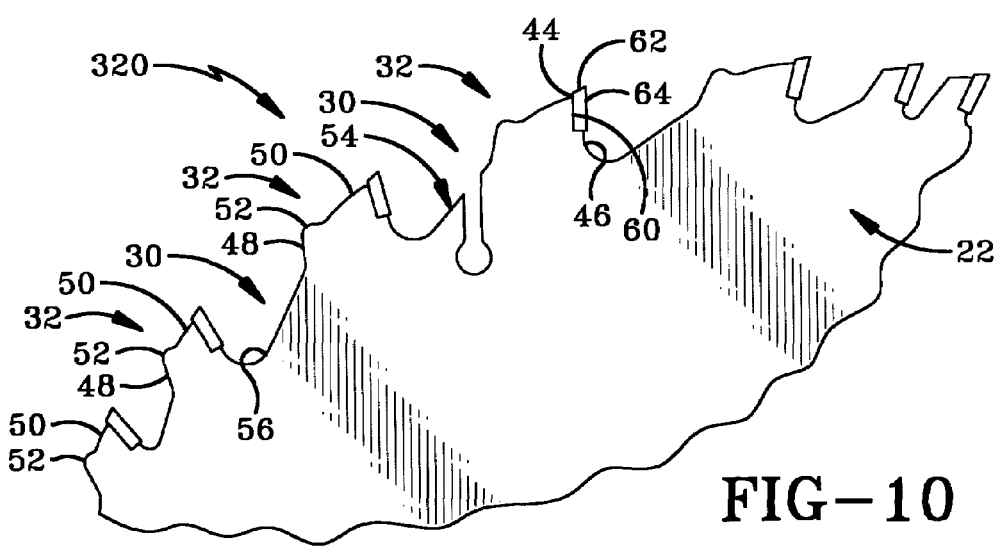
FIG. 10 is an enlarged view of a few teeth from the saw blade of the fourth embodiment in FIG. 9.
Figure 11:
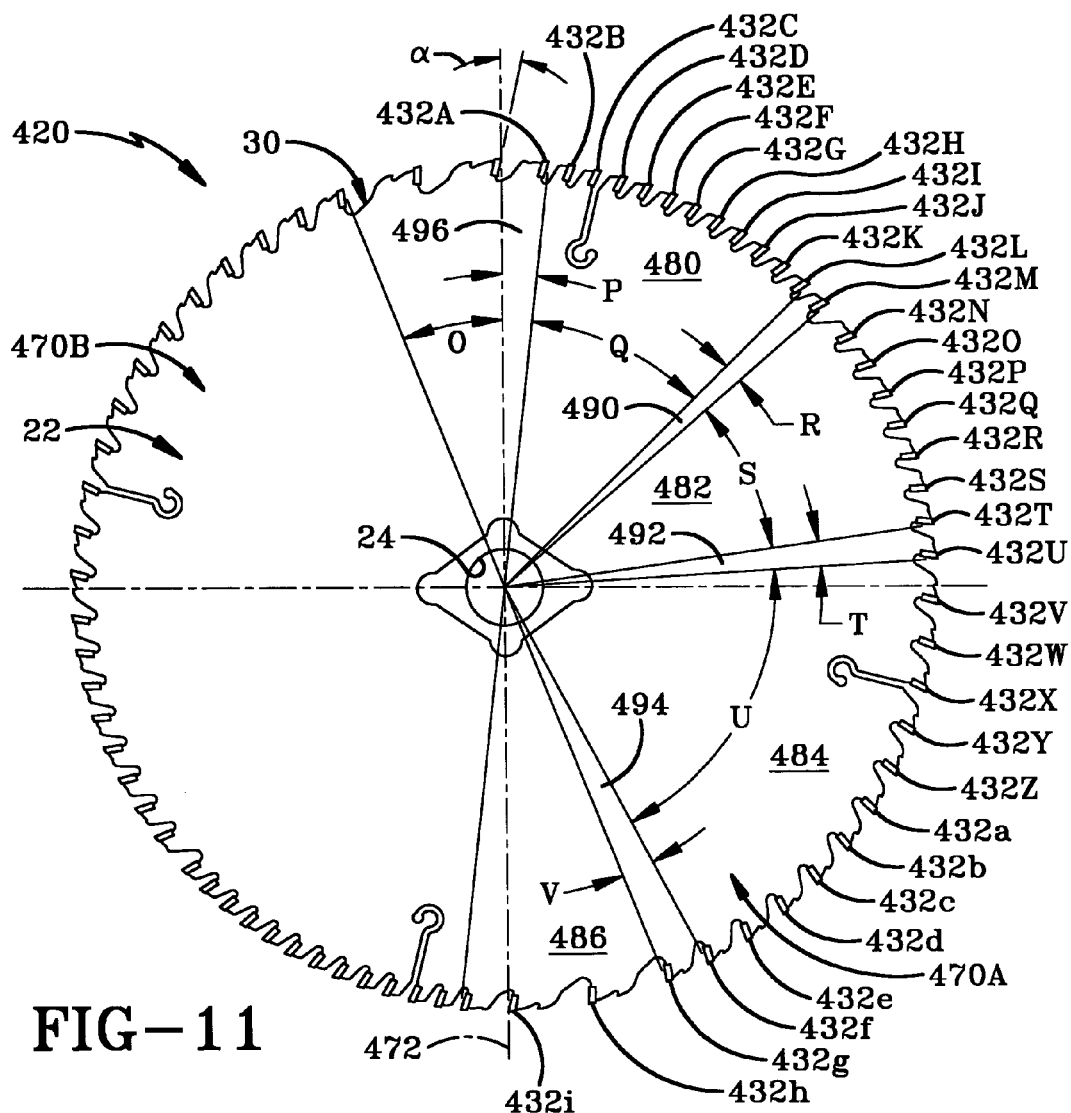
FIG. 11 is a side view of a fifth embodiment of the saw blade of the present invention with the sections clearly marked.
Figure 12:
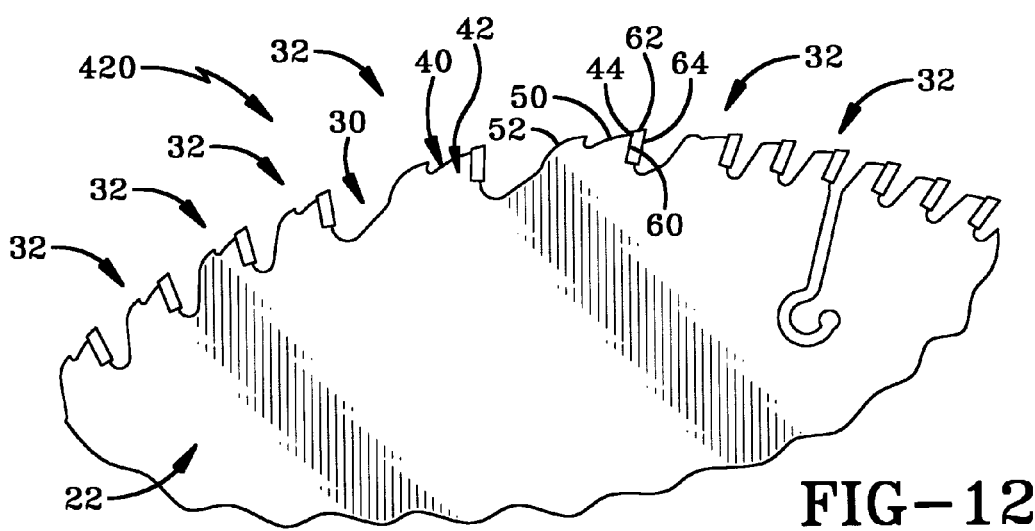
FIG. 12 is an enlarged view of a few teeth from the saw blade of the fifth embodiment in FIG. 11.

The improved saw blade of the present invention is shown in five embodiments in the Figures although other embodiments are contemplated as is apparent to one of skill in the art. Specifically, the first embodiment of the improved saw blade is indicated generally at 20 as shown in FIGS. 1–2; a second embodiment of the improved saw blade is indicated generally at 120 as shown in FIGS. 4–5; a third embodiment of the improved saw blade is indicated generally at 220 as shown in FIGS. 7–8; a fourth embodiment of the improved saw blade is indicated generally at 320 as shown in FIGS. 9–10; and a fifth embodiment of the improved saw blade is indicated generally at 420 as shown in FIGS. 11–12.

The first, second and third embodiments, respectively saw blades 20, 120 and 220, are embodied as standard seven-and-one-quarter-inch diameter saw blades although each may be of any other diameter used or contemplated by those of skill in the art. The fourth embodiment, saw blade 320, is embodied as a ten-inch diameter saw blade and the fifth embodiment, saw blade 320, is embodied as a twelve-inch diameter saw blade, although each may be of any other diameter used or contemplated by those of skill in the art. The saw blade, whether embodied as blade 20, 120, 220, 320 or 420, is a flat, circular disc 22, made of steel or other like metals, with a center arbor hole 24 as is well known in the art. The disc 22 includes a peripheral edge 30 with a plurality of circumferentially-spaced teeth projecting radially outwardly therefrom for cutting and generally referred to as 32. Each tooth 32 has a cutting edge 44 and is more fully described below.

In accordance with one of the features of the invention, the blade is divided into an even number of groups or sections, and in more detail blades 20 and 220 in respective first and third embodiments are each divided into two halves of six sections while blades 120, 320 and 420 in respective second, fourth and fifth embodiments are each divided into two halves of eight sections. Each section along the peripheral edge has a matching or copy exact section diametrically opposite thereto such that a symmetry-like line divides the blade into two halves of a repeating pattern.

In further accordance with one of the features of the invention, the sections in each half do not have the same number of teeth or teeth of the same size as the other sections. More particularly, there are a different number of cutting edges 44 in each section in each half and the circumferential width between each of the adjacent cutting edges 44 within a given section is different than that of each other section in a given half. Blade 420 of the fifth embodiment is a partial exception to this rule regarding the differing number of teeth or cutting edges from group to group. Specifically, blade 420 includes respectively within its four sections on one half of the blade twelve cutting edges, eight cutting edges, twelve cutting edges and three cutting edges. Thus, while the number of cutting edges (and teeth) within each section changes between adjacent sections, the first and third sections have the same number of cutting edges. However, the size of the teeth in each section of blade 420 are different from those in each other section, as with the other blades.

Preferably in accordance with another feature of the invention, the size of the teeth remains the same and/or decreases in each section from a largest size to a smallest size in the direction of cutting (or vice versa), while the number of teeth increases or remains the same in each section in the direction of cutting (or vice versa respectively). More particularly, the circumferential width between each adjacent pair of cutting edges 44 remains the same and/or decreases in each section from largest to smallest in the direction of cutting (or vice versa), while the number of cutting edges 44 increases or remains the same in each section in the direction of cutting (or vice versa respectively). Once again, blade 420 of the fifth embodiment is a partial exception to this preferred rule. While the size of the teeth follow the rule, the number of teeth does not, because, as described in the previous paragraph, blade 420 has a "twelve-eight-twelve-three" cutting edge pattern between respective adjacent sections.

Each tooth 32 includes a tooth body 40 defined as a sloped face or land 42 culminating in outwardly extending cutting edge 44. On the opposite side of cutting edge 44 from land 42 is a notch or void 54 which communicates with the land 42 of an adjacent tooth 32. Notch 54 thus separates the cutting edge 44 of one tooth 32 from the land 42 of an adjacent tooth 32. More specifically, notch 54 includes a radial face 46 extending inwardly toward hole 24 adjacent cutting edge 44 of one tooth 32 into a bend 56 which communicates with land 42 of an adjacent tooth 32. Land 42 may include an optional additional cutting or finishing edge 52 in the middle thereof for reducing kick-back and providing smoother cuts, whereby such land 42 in the embodiment shown includes a first steep tapered section 48 and a second slightly tapered section 50 separated by the additional cutting edge 52 although other configurations are contemplated including only one tapered section of a constant taper or a gradually changing taper. Specifically, land 42 may be any form of a surface behind tooth 32 that transitions into notch 54. Cutting edge 44 may be a sharpened edge, or, as in the embodiments, an L-shaped seat 60 in which an insert such as a carbide or diamond tip 62 is seated and secured. The insert has a cutting face 64. Where an insert is used, cutting edge 64 becomes the cutting edge of a tooth 32 and thus the term "cutting edge" includes "cutting face" in that scenario.

Generally, it is preferred that tooth 32 include a cutting edge 52, as shown in FIG. 8, which helps remove saw dust from blade 220, 320 or 420 to enhance the cutting effect of cutting edge 44 or cutting edge 64. Alternately, cutting edge 52 may be an anti-kickback hump, as shown in FIG. 10, which limits the rate of cutting to prevent the saw blade from kicking back and causing injury. Smaller-size teeth are simply too small to practically accommodate a cutting edge 52, as seen with the teeth in section 380 on blade 320 and in section 480 on blade 420.

In accordance with yet another feature of the invention, the hook angle α of each tooth is most preferably between 15° (fifteen degrees) and 25°(twenty-five degrees). The hook angle α is specifically the angle between the tangent to the cutting face 44 and a radius line through hole 24.

In accordance with yet one more feature of the invention, it has been discovered that alternating the number of teeth or cutting edges in adjacent sections from odd to even provides additional benefits including noise reduction. Blade 120 of the second embodiment is the only blade of those described herein adhering to this pattern. However, it has also been found that noise and vibrations are reduced with blades including at least one section having an even number of cutting edges and at least one section having an odd number of cutting edges.

In more detail as to the first embodiment of the blade referred to as 20, teeth 32 are arranged in a unique eighteen-tooth design that is divided into two copy exact sections, namely a first side 70A and a second side 70B divided by axis 72. Since the blade as shown in FIGS. 1–2 has a right and left copy exact side (sides 70A and 70B respectively), only the right side will be described below (except where necessary to refer to the other or left side where transitions occur). The first side 70A includes nine teeth, namely teeth 32A, 32B, 32C, 32D, 32E, 32F, 32G, 32H, and 32I separated by voids 54.

In accordance with another feature of the invention, the nine teeth 32A, 32B, 32C, 32D, 32E, 32F, 32G, 32H, and 32I of each side 70A and 70B are not all identical in size and spacing. Specifically in the embodiment shown, first side 70A is divided into three sections 80, 82 and 84 (and thus the saw blade 20 has six sections over sides 70A and 70B) of varying circumferential distance with differing number of teeth and size of teeth in each.

Section 80 includes cutting edges 44 of five teeth 32, namely teeth 32A, 32B, 32C, 32D, and 32E, and these cutting edges define a first circumferential width between each adjacent pair of the cutting edges. Section 80 also includes the trailing components of four teeth 32, namely teeth 32B, 32C, 32D, and 32E, so that those four teeth are fully within section 80, and those teeth within section 80 are substantially identical to one another. These trailing components include land 42 having tapered sections 48 and 50, and optional additional cutting edge 52. Thereafter, section 82 includes cutting edges 44 of three teeth, namely teeth 32F, 32G and 32H and these cutting edges define a second circumferential width between each adjacent pair of the cutting edges that is different from the first circumferential width. Section 82 also includes the trailing components of two teeth, namely teeth 32G and 32H, so that those two teeth are fully within section 82 and those teeth within section 82 are substantially identical to one another. Further thereafter, section 84 includes cutting edge 44 of one tooth, namely tooth 32I, along with its trailing components, so that tooth 32I is fully within section 84.

Each of sections 80, 82 and 84 is specifically measured as the group circumferential width from the first cutting edge 44 of a section to the last cutting edge 44 in the same section except where a section has only one cutting edge 44 and thus its group circumferential width is defined from the cutting edge 44 of the last tooth 32 of the previous section to the only cutting edge 44 in the section.

Specifically, section 80 is the group circumferential width from the cutting edge 44 of the first tooth 32A of the section 80 to the cutting edge 44 of the last tooth 32E in the same section 80, which is defined as angle β. Section 82 is the group circumferential width from the cutting edge 44 of the first tooth 32F of the section 82 to the cutting edge 44 of the last tooth 32H in the same section 82, which is defined as angle X. Section 84 with only one tooth is the group circumferential width from the cutting edge 44 of the last tooth 32H of the previous section 82 to the only cutting edge 44 of the only tooth 32I in the section 84, which is defined as angle δ. The previous section for the first section is the last section, which would mean the last section of the other side where the blade has two copy exact sides, or simply the last section in the case where the sections span the entire circumference of the blade. For example, the section previous to section 80 of side 70A is section 84 of side 70B.

In between each of the sections are transitions or circumferential spaces 90, 92, and 94. Specifically, transition 90 is the space between sections 80 and 82, transition 92 is the space between sections 82 and 84 but since the section 84 has only one tooth then no transition exists as section 84 and transition 92 have the same definition, and transition 94 is the space between sections 84 and 80 of the next side (the left side). This space is defined as the circumferential width from the cutting edge 44 of the last tooth of a section to the cutting edge 44 of the first tooth in the next section. Specifically, transition 90 is the circumferential width from the cutting edge 44 of the tooth 32E of section 80 to the cutting edge 44 of the tooth 32F in the next section 82, which is defined as angle ε. Transition 92 does not exist due to the one-tooth nature of section 84. Transition 94 is the circumferential width from the cutting edge 44 of the tooth 32I of section 84 to the cutting edge 44 of the tooth 32A in the next section 80 (which is on the other side or left side in this case), which is defined as angle φ.

In accordance with one of the features of the invention, the section angle β is 60°, the section angle X is 40°, the section angle δ is 36°, the transition angle ε is 20°, and the transition angle φ is 24°. The effect is a design where section 80 has cutting edges 44 for five teeth, section 82 has cutting edges 44 for three teeth, and section 84 has cutting edges for one tooth, with uneven transitions between sections 80 and 82, and between 84 and 80 of the other side (the left side). Although it is noted above that no transition 92 exists between sections 82 and 84 because the definition of transition 92 is the same as section 84, nonetheless, it is also seen that what might be considered as transition 92 also differs from either of transitions 90 and 94.

In more detail as to the second embodiment of the blade referred to as 120, teeth 32 are arranged in a unique thirty-six tooth design that is divided into two copy exact sections, namely a first side 170A and a second side 170B by axis 172. Since the blade as shown in FIGS. 4–5 has a right and left copy exact side (sides 170A and 170B respectively), only the right side will be described below (except where necessary to refer to the left side). The first side 170A includes eighteen teeth, namely teeth 132A, 132B, 132C, 132D, 132E, 132F, 132G, 132H, 132I, 132J, 132K, 132L, 132M, 132N, 132O, 132P, 132Q, and 132R.

As with the first embodiment and in accordance with one of the features of the invention, the eighteen teeth 132A, 132B, 132C, 132D, 132E, 132F, 132G, 132H, 132I, 132J, 132K, 132L, 132M, 132N, 132O, 132P, 132Q, and 132R of each side 170A and 170B are not all identical in size and spacing. Specifically in the embodiment shown, first side 170A is divided into four sections 180, 182, 184 and 186 (and thus saw blade 120 has eight sections) of varying circumferential distance with differing number of teeth and size of teeth in each. Section 180 includes cutting edges 44 of seven teeth, namely teeth 132A, 132B, 132C, 132D, 132E, 132F, and 132G, and these cutting edges define a first circumferential width between each adjacent pair of the cutting edges. Section 180 also includes the trailing components of six teeth, namely teeth 132B, 132C, 132D, 132E, 132F and 132G, so that those six teeth are fully within section 180, and those teeth within section 180 are substantially identical to one another. As noted above, the trailing components include land 42 including tapered sections 48 and 50, and optional additional cutting edge 52. Thereafter, section 182 includes cutting edges 44 of six teeth, namely teeth 132H, 132I, 132J, 132K, 132L and 132M, and these cutting edges define a second circumferential width between each adjacent pair of the cutting edges that is different from the first circumferential width. Section 182 also includes the trailing components of five teeth, namely teeth 132I, 132J, 132K, 132L and 132M, so that those five teeth are fully within section 182, and those teeth within section 182 are substantially identical to one another. Further thereafter, section 184 includes cutting edges 44 of three teeth, namely teeth 132N, 132O and 132P, and these cutting edges define a third circumferential width between each adjacent pair of the cutting edges that is different from the first and second circumferential widths. Section 184 also includes the trailing components of two teeth, namely teeth 132O and 132P, so that those two teeth are fully within section 184, and those teeth within section 184 are substantially identical to one another. Finally thereafter, section 186 includes cutting edges 44 of two teeth, namely teeth 132Q and 132R, along with the trailing components of tooth 132R, so that tooth 132R is fully within section 186, and these cutting edges define a fourth circumferential width between the cutting edges that is different from the first, second and third circumferential widths.

In the same manner as described above with reference to the first embodiment, each section is specifically measured as the group circumferential width from the cutting edge 44 of the first tooth of a section to the cutting edge 44 of the last tooth in the same section except where a section has only one tooth 132 and thus its group circumferential width is defined from the cutting edge 44 of the last tooth 132 of the previous section to the cutting edge 44 of the only tooth 132 in the section. Specifically, section 180 is the group circumferential width from the cutting edge 44 of the first tooth 132A of the section 180 to the cutting edge 44 of the last tooth 132G in the same section 180, which is defined as angle γ. Section 182 is the group circumferential width from the cutting edge 44 of the first tooth 132H of the section 182 to the cutting edge 44 of the last tooth 132M in the same section 182, which is defined as angle η. Section 184 is the group circumferential width from the cutting edge 44 of the first tooth 132N of the section 184 to the cutting edge 44 of the last tooth 132P in the same section 184, which is defined as angle φ. Section 186 is the group circumferential width from the cutting edge 44 of the first tooth 132Q of the section 186 to the cutting edge 44 of the last tooth 132R in the same section 186, which is defined as angle κ.

In between each of the sections are transitions or circumferential spaces 190, 192, 194 and 196. Specifically, transition 190 is the space between sections 180 and 182, transition 192 is the space between sections 182 and 184, transition 194 is the space between sections 184 and 186, and transition 196 is the space between sections 186 and 180 of the next side (the left side). This space is defined as the circumferential width from the cutting edge 44 of the last tooth of a section to cutting edge 44 of the first tooth in the next section. Specifically, transition 190 is the circumferential width from cutting edge 44 of tooth 132G of section 180 to cutting edge 44 of tooth 132H in the next section 182, which is defined as angle λ. Transition 192 is the circumferential width from cutting edge 44 of tooth 132M of section 182 to cutting edge 44 of tooth 132N in the next section 184, which is defined as angle μ. Transition 194 is the circumferential width from cutting edge 44 of tooth 132P of section 184 to cutting edge 44 of tooth 132Q in the next section 186, which is defined as angle θ. Transition 196 is the circumferential width from cutting edge 44 of tooth 132R of section 186 to cutting edge 44 of tooth 132A in the next section 180 (which is on the other side or left side in this case), which is defined as angle σ.

In accordance with one of the features of the invention, the circumferential width or section angle γ is 36.015°, the section angle η is 44.985°, the section angle φ is 30.015°, the section angle κ is 20°, the transition angle λ is 9°, the transition angle μ is 9.985°, the transition angle θ is 10°, and the transition angle σ is 20°.

In more detail as to the third embodiment of the blade referred to as 220, teeth 32 are arranged in a unique twenty-tooth design that is divided into two copy exact sections, namely a first side 270A and a second side 270B divided by axis 272. Since the blade as shown in FIGS. 7–8 has a right and left copy exact side (sides 270A and 270B respectively), only the right side will be described below (except where necessary to refer to the other or left side where transitions occur). The first side 270A includes ten teeth, namely teeth 232A, 232B, 232C, 232D, 232E, 232F, 232G, 232H, 232I and 232J separated by voids 54.

In accordance with another feature of the invention, the ten teeth 232A, 232B, 232C, 232D, 232E, 232F, 232G, 232H, 232I and 232J of each side 270A and 270B are not all identical in size and spacing. Specifically in the embodiment shown, first side 270A is divided into three sections 280, 282 and 284 (and thus the saw blade 220 has six sections over sides 270A and 270B) of varying circumferential distance with differing number of teeth and size of teeth in each.

Section 280 includes cutting edges 44 of five teeth 32, namely teeth 232A, 232B, 232C, 232D, and 232E, and these cutting edges define a first circumferential width between each adjacent pair of the cutting edges. Section 280 also includes the trailing components of four teeth 32, namely teeth 232B, 232C, 232D, and 232E, so that those four teeth are fully within section 280, and those teeth within section 280 are substantially identical to one another. These trailing components include land 42 having tapered sections 48 and 50, and optional additional cutting edge 52. Thereafter, section 282 includes cutting edges 44 of three teeth, namely teeth 232F, 232G and 232H, and these cutting edges define a second circumferential width between each adjacent pair of the cutting edges that is different from the first circumferential width. Section 282 also includes the trailing components of two teeth, namely teeth 232G and 232H, so that those two teeth are fully within section 282, and those teeth within section 282 are substantially identical to one another. Further thereafter, section 284 includes cutting edge 44 of two teeth, namely teeth 232I and 232J, along with the trailing components of tooth 232J so that tooth 232J is fully within section 284, and these cutting edges define a third circumferential width between the cutting edges that is different from the first and second circumferential widths.

Each of sections 280, 282 and 284 is specifically measured as the group circumferential width from the first cutting edge 44 of a section to the last cutting edge 44 in the same section. Specifically, section 280 is the group circumferential width from the first cutting edge 44 of tooth 232A of section 280 to the last cutting edge 44 of tooth 232E in the same section 280, which is defined as angle B. Section 282 is the group circumferential width from the first cutting edge 44 of tooth 232F of section 282 to the last cutting edge 44 of tooth 232H in the same section 282, which is defined as angle D. Section 284 is the group circumferential width from the first cutting edge 44 of tooth 232I of section 284 to the last cutting edge 44 of tooth 232J in the same section 284, which is defined as angle F.

In between each of the sections are transitions or group circumferential spaces 290, 292, and 294. Specifically, transition 290 is the space between sections 280 and 282, transition 292 is the space between sections 282 and 284, and transition 294 is the space between sections 284 and 280 of the next side (the left side). This space is defined as the group circumferential width from the last cutting edge 44 of a section to the first cutting edge 44 in the next section. Specifically, transition 290 is the circumferential width from the last cutting edge 44 of tooth 232E of section 280 to the first cutting edge 44 of tooth 232F in the next section 282, which is defined as angle C. Transition 292 is the circumferential width from the last cutting edge 44 of tooth 232H of section 282 to the first cutting edge 44 of tooth 232I in the next section 284, which is defined as angle E. Transition 294 is the circumferential width from the last cutting edge 44 of the tooth 232J of section 284 to the first cutting edge 44 of tooth 232A in the next section 280 (which is on the other side or left side in this case), which is defined as angle A.

In accordance with one of the features of the invention, the section angle B falls in a range of 54° to 58°, the section angle D falls in a range of 38° to 42°, the section angle F falls in a range of 23° to 27°, the transition angle C falls in a range of 12° to 16°, the transition angle E falls in a range of 18° to 22°, and the transition angle A falls in a range of 23° to 27°. More preferably, the section angle B is approximately 56°, the section angle D is approximately 40°, the section angle F is approximately 25°, the transition angle C is approximately 14°, the transition angle E is approximately 20°, and the transition angle A is approximately 25°. Most preferably, section angle B is 56.000°, the section angle D is 40.000°, the section angle F is 25.000°, the transition angle C is 14.000°, the transition angle E is 20.000°, and the transition angle A is 25.000°. The effect is a design where section 280 has cutting edges 44 for five teeth, section 282 has cutting edges 44 for three teeth, and section 284 has cutting edges for two teeth, with uneven transitions between sections 280 and 282, between 282 and 284, and between 284 and 280 of the other side (the left side).

In more detail as to the fourth embodiment of the blade referred to as 320, teeth 32 are arranged in a unique fifty-tooth design that is divided into two copy exact sections, namely a first side 370A and a second side 370B by axis 372. Since the blade as shown in FIGS. 9–10 has a right and left copy exact side (sides 370A and 370B respectively), only the right side will be described below (except where necessary to refer to the left side). The first side 370A includes twenty-five teeth, namely teeth 332A, 332B, 332C, 332D, 332E, 332F, 332G, 332H, 332I, 332J, 332K, 332L, 332M, 332N, 332O, 332P, 332Q, 332R, 332S, 332T, 332U, 332V, 332W, 332X, and 332Y.

As with the previous embodiments and in accordance with one of the features of the invention, the twenty-five teeth 332A, 332B, 332C, 332D, 332E, 332F, 332G, 332H, 332I, 332J, 332K, 332L, 332M, 332N, 332O, 332P, 332Q, 332R, 332S, 332T, 332U, 332V, 332W, 332, and 332Y of each side 370A and 370B are not all identical in size and spacing. Specifically in the embodiment shown, first side 370A is divided into four sections 380, 382, 384 and 386 (and thus saw blade 320 has eight sections) of varying circumferential distance with differing number of teeth and size of teeth in each. Section 380 includes cutting edges 44 of nine teeth, namely teeth 332A, 332B, 332C, 332D, 332E, 332F, 332G, 332H and 332I, and these cutting edges define a first circumferential width between each adjacent pair of the cutting edges. Section 380 also includes the trailing components of eight teeth, namely teeth 332B, 332C, 332D, 332E, 332F, 332G, 332H and 332I, so that those eight teeth are fully within section 380, and those teeth within section 380 are substantially identical to one another. As noted above, the trailing components include land 42 including tapered sections 48 and 50, and optional additional cutting edge 52. Thereafter, section 382 includes cutting edges 44 of seven teeth, namely teeth 332J, 332K, 332L, 332M, 332N, 332O and 332P, and these cutting edges define a second circumferential width between each adjacent pair of the cutting edges that is different from the first circumferential width. Section 382 also includes the trailing components of six teeth, namely teeth 332K, 332L, 332M, 332N, 332O and 332P, so that those six teeth are fully within section 382, and those teeth within section 382 are substantially identical to one another. Further thereafter, section 384 includes cutting edges 44 of five teeth, namely teeth 332Q, 332R, 332S, 332T and 332U, and these cutting edges define a third circumferential width. between each adjacent pair of the cutting edges that is different from the first and second circumferential widths. Section 384 also includes the trailing components of four teeth, namely teeth 332R, 332S, 332T and 332U, so that those four teeth are fully within section 384, and those teeth within section 384 are substantially identical to one another. Finally thereafter, section 386 includes cutting edges 44 of four teeth, namely teeth 332V, 332W, 332X and 332Y, and these cutting edges define a fourth circumferential width between each adjacent pair of the cutting edges that is different from the first, second and third circumferential widths. Section 386 also includes the trailing components of three teeth, namely teeth 332W, 332X and 332Y, so that those three teeth are fully within section 386, and those teeth within section 386 are substantially identical to one another.

As with the previous embodiments, each of sections 380, 382, 384 and 386 is specifically measured as the group circumferential width from the first cutting edge 44 of a section to the last cutting edge 44 in the same section. Specifically, section 380 is the group circumferential width from the first cutting edge 44 of tooth 332A of section 380 to the last cutting edge 44 of tooth 332I in the same section 380, which is defined as angle H. Section 382 is the group circumferential width from the first cutting edge 44 of tooth 332J of section 382 to the last cutting edge 44 of tooth 332P in the same section 382, which is defined as angle J. Section 384 is the group circumferential width from the first cutting edge 44 of tooth 332Q of section 384 to the last cutting edge 44 of tooth 332U in the same section 384, which is defined as angle L. Section 386 is the group circumferential width from the first cutting edge 44 of tooth 332V of section 386 to the last cutting edge 44 of tooth 332Y in the same section 386, which is defined as angle N.

In between each of the sections are transitions or circumferential spaces 390, 392, 394 and 396. Specifically, transition 390 is the space between sections 380 and 382, transition 392 is the space between sections 382 and 384, transition 394 is the space between sections 384 and 386, and transition 396 is the space between sections 386 and 380 of the next side (the left side). This space is defined as the circumferential width from the last cutting edge 44 of a section to the first cutting edge 44 in the next section. Specifically, transition 390 is the circumferential width from the last cutting edge 44 of tooth 332I of section 380 to the first cutting edge 44 of tooth 332J in the next section 382, which is defined as angle I. Transition 392 is the circumferential width from the last cutting edge 44 of tooth 332P of section 382 to the first cutting edge 44 of tooth 332Q in the next section 384, which is defined as angle K. Transition 394 is the circumferential width from the last cutting edge 44 of the tooth 332U of section 384 to the first cutting edge 44 of tooth 332V in the next section 386, which is defined as angle M. Transition 396 is the circumferential width from the last cutting edge 44 of the tooth 332Y of section 386 to the first cutting edge 44 of tooth 332A in the next section 380 (which is on the other side or left side in this case), which is defined as angle G.

In accordance with one of the features of the invention, the circumferential width or section angle H falls in a range of 34° to 38°, the section angle J falls in a range of 34° to 38°, the section angle L falls in a range of 34° to 38°, the section angle N falls in a range of 43° to 47°, the transition angle I falls in a range of 2.5°to 6.5°, the transitional angle K falls in a range of 4° to 8°, the transition angle M falls in the range of 7° to 11°, and the transition angle G falls in a range of 5.5° to 9.5°. More preferably, the circumferential width for sectional angle H is approximately 36°, the section angle J is approximately 36°, the section angle L is approximately 36°, the section angle N is approximately 45°, the transitional angle I is approximately 4.5°, the transition angle K is approximately 6°, the transition angle M is approximately 9°, and the transition angle G is approximately 7.5°. Most preferably, the circumferential width or section angle H is 36.000°, the section angle J is 35.933°, the section angle L is 36.000°, the section angle N is 45.000°, the transition angle I is 4.423°, the transition angle K is 6.139°, the transition angle M is 9.000°, and the transition angle G is 7.500°.

In more detail as to the fifth embodiment of the blade referred to as 420, teeth 32 are arranged in a unique seventy-tooth design that is divided into two copy exact sections, namely a first side 470A and a second side 470B by axis 472. Since the blade as shown in FIGS. 11–12 has a right and left copy exact side (sides 470A and 470B respectively), only the right side will be described below (except where necessary to refer to the left side). The first side 470A includes thirty-five teeth, namely teeth 432A, 432B, 432C, 432D, 432E, 432F, 432G, 432H, 432I, 432J, 434K, 432L, 432M, 432N, 432O, 432P, 432Q, 432R, 432S, 432T, 432U, 432V, 432W, 432X , 432Y, 432Z, 432a, 432b, 432c, 432d, 432e, 432f, 432g, 432h, and 432i.

As with the previous embodiments and in accordance with one of the features of the invention, the thirty-five teeth 432A, 432B, 432C, 432D, 432E, 432F, 432G, 432H, 432I, 432J, 434K, 432L, 432M, 432N, 432O, 432P, 432Q, 432R, 432S, 432T, 432U, 432V, 432W, 432, 432Y, 432Z, 432a, 432b, 432c, 432d, 432e, 432f, 432g, 432h, and 432i of each side 470A and 470B are not all identical in size and spacing. Specifically in the embodiment shown, first side 470A is divided into four sections 480, 482, 484 and 486 (and thus saw blade 420 has eight sections) of varying circumferential distance with differing number of teeth and size of teeth in each. Section 480 includes cutting edges 44 of twelve teeth, namely teeth 432A, 432B, 432C, 432D, 432E, 432F, 432G, 432H, 432I, 432J, 434K and 432L, and these cutting edges define a first circumferential width between each adjacent pair of the culling edges. Section 480 also includes the trailing components of eleven teeth, namely teeth 432B, 432C, 432D, 432E, 432F, 432G, 432H, 432I, 432J, 434K and 432L, so that those eleven teeth are fully within section 480, and those teeth within section 480 are substantially identical to one another. As noted above, the trailing components include land 42 including tapered sections 48 and 50, and optional additional cutting edge 52. Thereafter, section 482 includes cutting edges 44 of eight teeth, namely teeth 432M, 432N, 432O, 432P, 432Q, 432R, 432S, 432T, and these cutting edges define a second circumferential width between each adjacent pair of the cutting edges that is different from the first circumferential width. Section 482 also includes the trailing components of seven teeth, namely teeth 432N, 432O, 432P, 432Q, 432R, 432S and 432T, so that those seven teeth are fully within section 482, and those teeth within section 482 are substantially identical to one another. Further thereafter, section 484 includes cutting edges 44 of twelve teeth, namely teeth 432U, 432V, 432W, 432X, 432Y, 432Z, 432a, 432b, 432c, 432d, 432e and 432f, and these cutting edges define a third circumferential width between each adjacent pair of the cutting edges that is different from the first and second circumferential widths. Section 484 also includes the trailing components of eleven teeth, namely teeth 432V, 432W, 432X, 432Y, 432Z, 432*a*, 432*b*, 432*c*, 432*d*, 432*e* and 432*f*, so that those eleven teeth are fully within section 484, and those teeth within section 384 are substantially identical to one another. Finally thereafter, section 486 includes cutting edges 44 of three teeth, namely teeth 432*g*, 432*h*, and 432*i*, and these cutting edges define a fourth circumferential width between each adjacent pair of the cutting edges that is different from the first, second and third circumferential widths. Section 486 also includes the trailing components of two teeth, namely teeth 432*h* and 432*i*, so that those two teeth are fully within section 486, and those teeth within section 486 are substantially identical to one another.

As with the previous embodiments, each of sections 480, 482, 484 and 486 is specifically measured as the group circumferential width from the first cutting edge 44 of a section to the last cutting edge 44 in the same section. Specifically, section 480 is the group circumferential width from the first cutting edge 44 of tooth 432A of section 480 to the last cutting edge 44 of tooth 432L in the same section 480, which is defined as angle Q. Section 482 is the group circumferential width from the first cutting edge 44 of tooth 432M of section 482 to the last cutting edge 44 of tooth 432T in the same section 482, which is defined as angle S. Section 484 is the group circumferential width from the first cutting edge 44 of tooth 432U of section 484 to the last cutting edge 44 of tooth 432*f* in the same section 484, which is defined as angle U. Section 486 is the group circumferential width from the first cutting edge 44 of tooth 432*g* of section 486 to the last cutting edge 44 of tooth 432*i* in the same section 486, which is defined as angle O.

In between each of the sections are transitions or circumferential spaces 490, 492, 494 and 496. Specifically, transition 490 is the space between sections 480 and 482, transition 492 is the space between sections 482 and 484, transition 494 is the space between sections 484 and 486, and transition 496 is the space between sections 486 and 480 of the next side (the left side). This space is defined as the circumferential width from the last cutting edge 44 of a section to the first cutting edge 44 in the next section. Specifically, transition 490 is the circumferential width from the last cutting edge 44 of tooth 432L of section 480 to the first cutting edge 44 of tooth 432M in the next section 482, which is defined as angle R. Transition 492 is the circumferential width from the last cutting edge 44 of tooth 432T of section 482 to the first cutting edge 44 of tooth 432U in the next section 484, which is defined as angle T. Transition 494 is the circumferential width from the last cutting edge 44 of the tooth 432*f* of section 484 to the first cutting edge 44 of tooth 432*g* in the next section 486, which is defined as angle V. Transition 496 is the circumferential width from the last cutting edge 44 of the tooth 432*i* of section 486 to the first cutting edge 44 of tooth 432A in the next section 480 (which is on the other side or left side in this case), which is defined as angle P.

In accordance with one of the features of the invention, the circumferential width or section angle Q falls in a range of 36.5° to 40.5°, the section angle S falls in a range of 30.5° to 34.5°, the section angle U falls in a range of 64° to 68°, the section angle O falls in a range of 19.5° to 23.5°, the transition angle R falls in a range of 1.5° to 5.5°, the transition angle T falls in a range of 2.5° to 6.5°, the transition angle V falls in a range of 4° to 8°, and the transition angle P falls in a range of 5.5° to 9.5°. More preferably, circumferential width for section angle Q is approximately 38.5°, the section angle S is approximately 32.5°, the section angle U is approximately 66°, the section angle O is approximately 21.5°, the transition angle R is approximately 3.5°, the transitional angle T is approximately 4.5°, the transition angle V is approximately 6°, and transition angle P is approximately 7.5°. Most preferably, the circumferential width or section angle Q is 38.501°, the section angle S is 32.500°, the section angle U is 66.001°, the section angle O is 21.548°, the transition angle R is 3.499°, the transition angle T is 4.500°, the transition angle V is 6.000°, and the transition angle P is 7.452°.

Accordingly, the improved saw blade of the above embodiments is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved saw blade is constructed and used, the characteristics of the construction, and the advantageous, new and useful results obtained; the new and useful structures, devices, elements, arrangements, parts and combinations, are set forth in the appended claims.

The invention claimed is:

1. A saw blade comprising:
   a flat, circular disc having a peripheral outer edge and a center hole;
   a plurality of circumferentially-spaced teeth each having a substantially axially extending cutting edge and projecting radially outwardly from the peripheral outer edge;
   a first group of the cutting edges defining a first circumferential width between each adjacent pair of the cutting edges in the first group;
   a second group of the cutting edges defining a second circumferential width between each adjacent pair of the cutting edges in the second group; the second circumferential width differing from the first circumferential width; and
   a third group of cutting edges defining a third circumferential width as the distance between adjacent the cutting edges in the third group; at least one of the first, second and third groups including at least three of the cutting edges; and the third circumferential width differing from the first and second circumferential widths.

2. The saw blade of claim 1 wherein the first group includes five cutting edges, the second group includes three cutting edges, and the third group includes two cutting edges.

3. The saw blade of claim 2 wherein the disc is divided into a first half and a second half with the first, second and third groups of cutting edges all being within the first half and defined as a first set, and the second half including a second set that is a copy exact of the first set positioned in a diametrically opposite manner.

4. The saw blade of claim 2 wherein the first group includes a first cutting edge and a last cutting edge defining therebetween a first group circumferential width of approximately fifty-six degrees; the second group includes a first cutting edge and a last cutting edge defining therebetween a second group circumferential width of approximately forty degrees; and the third group includes a first cutting edge and a last cutting edge defining therebetween a third group circumferential width of approximately twenty-five degrees.

5. The saw blade of claim 4 wherein the disc is divided into a first half and a second half with the first, second and third groups of cutting edges all being within the first half and defined as a first set, and the second half including a second set that is a copy exact of the first set positioned in a diametrically opposite manner.

6. The saw blade of claim 5 wherein at least three circumferential spaces are provided respectively between at least three of the first and second groups, the second and third groups, and the third and first groups, and wherein a first circumferential space is of approximately a fourteen-degree circumferential width, a second circumferential space is of approximately a twenty-degree circumferential width and a third circumferential space is of approximately a twenty-five-degree circumferential width.

7. The saw blade of claim 2 wherein the first group includes a first cutting edge and a last cutting edge defining therebetween a first group circumferential width ranging from fifty-four degrees to fifty-eight degrees, inclusive; the second group includes a first cutting edge and a last cutting edge defining therebetween a second group circumferential width ranging from thirty-eight degrees to forty-two degrees, inclusive; and the third group includes a first cutting edge and a last cutting edge defining therebetween a third group circumferential width ranging from twenty-three degrees to twenty-seven degrees, inclusive.

8. The saw blade of claim 7 wherein the disc is divided into a first half and a second half with the first, second and third groups of cutting edges all being within the first half and defined as a first set, and the second half including a second set that is a copy exact of the first set positioned in a diametrically opposite manner.

9. The saw blade of claim 8 wherein at least three circumferential spaces are provided respectively between at least three of the first and second groups, the second and third groups, and the third and first groups, and wherein the circumferential spaces include a first circumferential space having a circumferential width ranging from twelve degrees to sixteen degrees, inclusive, a second circumferential space having a circumferential width ranging from eighteen degrees to twenty-two degrees, inclusive, and a third circumferential space having a circumferential width ranging from twenty-three degrees to twenty-seven degrees, inclusive.

10. The saw blade of claim 2 wherein the first group includes a first cutting edge and a last cutting edge defining therebetween a first group circumferential width ranging from fifty-four degrees to fifty-eight degrees, inclusive.

11. The saw blade of claim 10 wherein the second group includes a first cutting edge and a last cutting edge defining therebetween a second group circumferential width ranging from thirty-eight degrees to forty-two degrees, inclusive.

12. The saw blade of claim 11 wherein a first circumferential space is provided between the first and second groups and has a circumferential width ranging from twelve degrees to sixteen degrees, inclusive.

13. The saw blade of claim 12 wherein the third group includes a first cutting edge and a last cutting edge defining therebetween a third group circumferential width ranging from twenty-three degrees to twenty-seven degrees, inclusive.

14. The saw blade of claim 13 wherein a second circumferential space is provided between the second and third groups and has a circumferential width ranging from eighteen degrees to twenty-two degrees, inclusive.

15. The saw blade of claim 10 wherein the third group includes a first cutting edge and a last cutting edge defining therebetween a third group circumferential width ranging from twenty-three degrees to twenty-seven degrees, inclusive.

16. The saw blade of claim 1 wherein a first circumferential space is provided between the first and second groups.

17. The saw blade of claim 16 wherein the first circumferential space extends between adjacent cutting edges such that there are no cutting edges within the first circumferential space.

18. The saw blade of claim 17 wherein a second circumferential space is provided between the second and third groups.

19. The saw blade of claim 18 wherein the second circumferential space extends between adjacent cutting edges such that there are no cutting edges within the second circumferential space.

20. The saw blade of claim 19 wherein the disc is divided into a first half and a second half with the first, second and third groups of cutting edges all being within the first half.

21. The saw blade of claim 20 further including a fourth group of the cutting edges which is within the second half of the disc and defines a fourth circumferential width as the distance between adjacent cutting edges in the fourth group; wherein the fourth circumferential width is the same as the first circumferential width; and wherein a third circumferential space is provided between the third and fourth groups.

22. The saw blade of claim 21 wherein the third circumferential space extends between adjacent cutting edges such that there are no cutting edges within the third circumferential space.

23. The saw blade of claim 22 further including a fifth group of the cutting edges which is within the second half of the disc and defines a fifth circumferential width as the distance between adjacent cutting edges in the fifth group; wherein the fifth circumferential width is the same as the second circumferential width; and wherein a fourth circumferential space is provided between the fourth and fifth groups.

24. The saw blade of claim 23 wherein the fourth circumferential space extends between adjacent cutting edges such that there are no cutting edges within the fourth circumferential space.

25. The saw blade of claim 24 further including a sixth group of the cutting edges which is within the second half of the disc and defines a sixth circumferential width as the distance between adjacent cutting edges in the sixth group; wherein the sixth circumferential width is the same as the third circumferential width; and wherein a fifth circumferential space is provided between the fifth and sixth groups.

26. The saw blade of claim 25 wherein the fifth circumferential space extends between adjacent cutting edges such that there are no cutting edges within the fifth circumferential space.

27. The saw blade of claim 26 wherein a sixth circumferential space is provided between the sixth and first groups.

28. The saw blade of claim 27 wherein the sixth circumferential space extends between adjacent cutting edges such that there are no cutting edges within the sixth circumferential space.

29. The saw blade of claim 1 further comprising a fourth group of the cutting edges defining a fourth circumferential width between each adjacent pair of the cutting edges in the fourth group; the fourth circumferential width differing from the first, second and third circumferential widths.

30. The saw blade of claim 29 wherein the first group includes nine cutting edges, the second group includes seven cutting edges, the third group includes five cutting edges, and the fourth group includes four cutting edges.

31. The saw blade of claim 30 wherein the disc is divided into a first half and a second half with the first, second, third and fourth groups of the cutting edges all being within the first half and defined as a first set, and the second half including a second set that is an exact copy of the first set positioned in a diametrically opposite manner.

32. The saw blade of claim 30 wherein the first group includes a first cutting edge and a last cutting edge defining therebetween a first group circumferential width of approximately thirty-six degrees; the second group includes a first cutting edge and a last cutting edge defining therebetween a second group circumferential width of approximately thirty-six degrees; the third group includes a first cutting edge and a last cutting edge defining therebetween a third group circumferential width of approximately thirty-six degrees; and the fourth group includes a first cutting edge and a last cutting edge defining therebetween a fourth group circumferential width of approximately forty-five degrees.

33. The saw blade of claim 32 wherein the disc is divided into a first half and a second half with the first, second, third and fourth groups of the cutting edges all being within the first half and defined as a first set, and the second half including a second set that is an exact copy of the first set positioned in a diametrically opposite manner.

34. The saw blade of claim 33 wherein between the first and second groups in both sets there is a first circumferential space of an approximately four-and-a-half-degree circumferential width; between the second and third groups in both sets there is a second circumferential space of an approximately six-degree circumferential width; between the third and fourth groups in both sets there is a third circumferential space of an approximately nine-degree circumferential width; and between the fourth group in each set and the first group in the respective other set there is a fourth circumferential space of an approximately seven-and-a-half-degree circumferential width.

35. The saw blade of claim 30 wherein the first group includes a first cutting edge and a last cutting edge defining therebetween a first group circumferential width ranging from thirty-four degrees to thirty-eight degrees, inclusive; the second group includes a first cutting edge and a last cutting edge defining therebetween a second group circumferential width ranging from thirty-four degrees to thirty-eight degrees, inclusive; the third group includes a first cutting edge and a last cutting edge defining therebetween a third group circumferential width ranging from thirty-four degrees to thirty-eight degrees; and the fourth group includes a first cutting edge and a last cutting edge defining therebetween a fourth group circumferential width ranging from forty-three degrees to forty-seven degrees, inclusive.

36. The saw blade of claim 35 wherein the disc is divided into a first half and a second half with the first, second, third and fourth groups of the cutting edges all being within the first half and defined as a first set, and the second half including a second set that is an exact copy of the first set positioned in a diametrically opposite manner.

37. The saw blade of claim 36 wherein between the first and second groups in both sets there is a first circumferential space having a circumferential width ranging from two-and-a-half degrees to six-and-a-half degrees; between the second and third groups in both set there is a second circumferential space having a circumferential width ranging from four degrees to eight degrees; between the third and fourth groups in both sets there is a third circumferential space having a circumferential width ranging from seven degrees to eleven degrees; and between the fourth group in each set and the first group in the respective other set there is a fourth circumferential space having a circumferential width ranging from five-and-a-half to nine-and-a-half degrees, inclusive.

38. The saw blade of claim 29 wherein the first group includes twelve cutting edges, the second group includes eight cutting edges, the third group includes twelve cutting edges, and the fourth group includes three cutting edges.

39. The saw blade of claim 38 wherein the disc is divided into a first half and a second half with the first, second, third and fourth groups of the cutting edges all being within the first half and defined as a first set, and the second half including a second set that is an exact copy of the first set positioned in a diametrically opposite manner.

40. The saw blade of claim 38 wherein the first group includes a first cutting edge and a last cutting edge defining therebetween a first group circumferential width of approximately thirty-eight-and-a-half degrees; the second group includes a first cutting edge and a last cutting edge defining therebetween a second group circumferential width of approximately thirty-two-and-a-half degrees; the third group includes a first cutting edge and a last cutting edge defining therebetween a third group circumferential width of approximately sixty-six degrees; and the fourth group includes a first cutting edge and a last cutting edge defining therebetween a fourth group circumferential width of approximately twenty-one-and-a-half degrees.

41. The saw blade of claim 40 wherein the disc is divided into a first half and a second half with the first, second, third and fourth groups of the cutting edges all being within the first half and defined as a first set, and the second half including a second set that is an exact copy of the first set positioned in a diametrically opposite manner.

42. The saw blade of claim 41 wherein between the first and second groups in both sets there is a first circumferential space of an approximately three-and-a-half-degree circumferential width; between the second and third groups in both sets there is a second circumferential space of an approximately four-and-a-half-degree circumferential width; between the third and fourth groups in both sets there is a third circumferential space of an approximately six-degree circumferential width; and between the fourth group in each set and the first group in the respective other set there is a fourth circumferential space of an approximately seven-and-a-half-degree circumferential width.

43. The saw blade of claim 38 wherein the first group includes a first cutting edge and a last cutting edge defining therebetween a first group circumferential width ranging from thirty-six-and-a-half degrees to forth-and-a-half degrees, inclusive; the second group includes a first cutting edge and a last cutting edge defining therebetween a second group circumferential width ranging from thirty-and-a-half to thirty-four-and-a-half degrees, inclusive; the third group includes a first cutting edge and a last cutting edge defining therebetween a third group circumferential width ranging from sixty-four degrees to sixty-eight degrees, inclusive; and the fourth group includes a first cutting edge and a last cutting edge defining therebetween a fourth group circumferential width ranging from nineteen-and-a-half degrees to twenty-three-and-a-half degrees, inclusive.

44. The saw blade of claim 43 wherein the disc is divided into a first half and a second half with the first, second, third and fourth groups of the cutting edges all being within the first half and defined as a first set, and the second half including a second set that is an exact copy of the first set positioned in a diametrically opposite manner.

45. The saw blade of claim 44 wherein between the first and second groups in both sets there is a first circumferential space having a circumferential width ranging from one-and-a-half degrees to five-and-a-half degrees, inclusive; between the second and third groups in both sets there is a second circumferential space having a circumferential width ranging from two-and-a-half degrees to six-and-a-half degrees, inclusive; between the third and fourth groups in both sets there is a third circumferential space having a circumferential width ranging from four degrees to eight degrees, inclusive; and between the fourth group in each set and the first group in the respective other set there is a fourth circumferential space having a circumferential width ranging from five-and-a-half degrees to nine-and-a-half degrees, inclusive.

46. A saw blade comprising:
- a flat, circular disc having a peripheral outer edge and a center hole, the disc being divided into a first half and a second half, each half being a copy exact of the other half positioned in a diametrically opposite manner;
- a plurality of circumferentially-spaced teeth each having a substantially axially extending cutting edge and projecting radially outwardly from the peripheral outer edge;
- a first group of the cutting edges in each half having five cutting edges including a first cutting edge and a last cutting edge defining therebetween a first group circumferential width of approximately fifty-six degrees;
- a second group of the cutting edges in each half having three cutting edges including a first cutting edge and a last cutting edge defining therebetween a second group circumferential width of approximately forty degrees;
- a third group of the cutting edges in each half having two cutting edges including a first cutting edge and a last cutting edge defining therebetween a third group circumferential width of approximately twenty-five degrees;
- a first circumferential space being between the first and second groups in each half and having an approximately fourteen-degree circumferential width;
- a second circumferential space being between the second and third groups in each half and having an approximately twenty-degree circumferential width; and
- a third circumferential space being between the third group in each half and the first group in the respective other half and having an approximately twenty-five-degree circumferential width.

* * * * *